May 21, 1963 K. E. SNYDER 3,090,251
TRANSMISSION
Filed Aug. 19, 1957 2 Sheets-Sheet 1
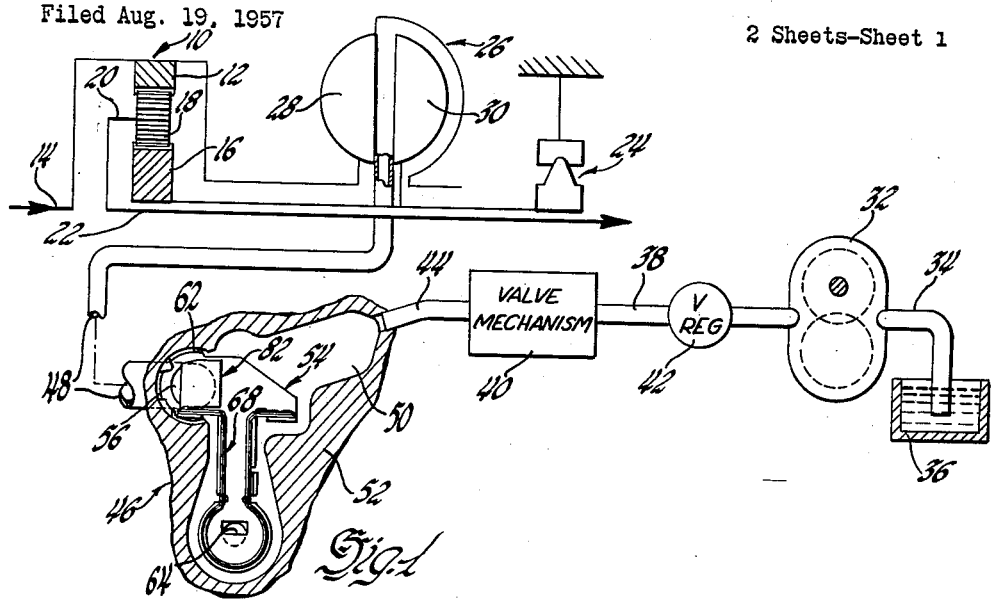
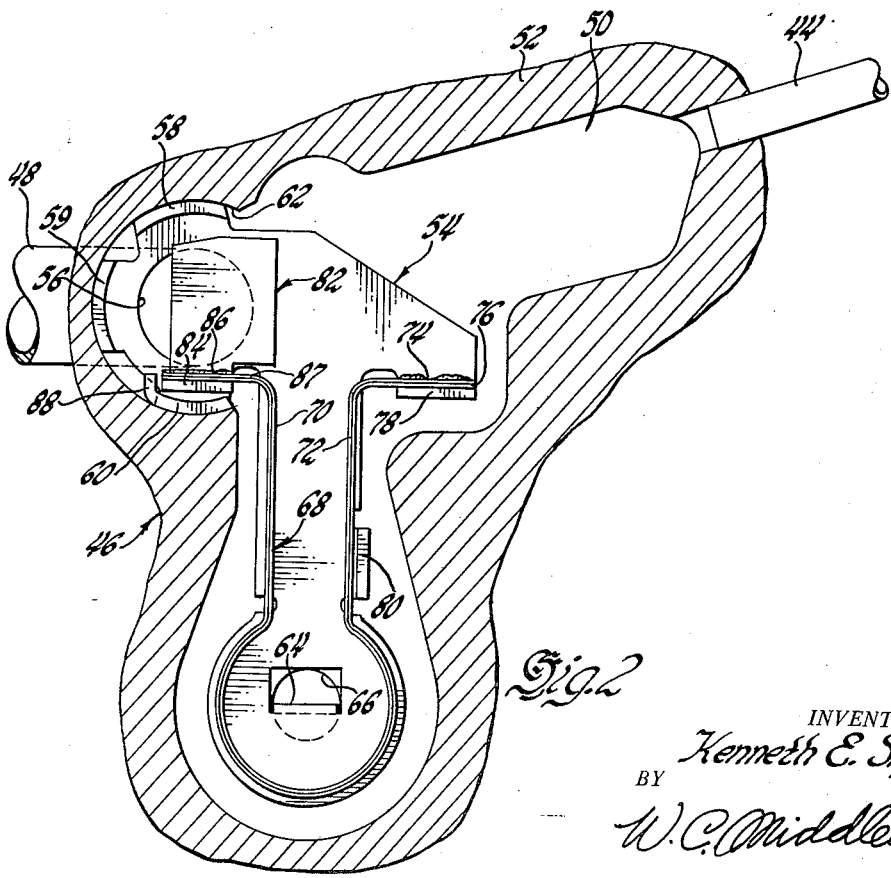
INVENTOR.
Kenneth E. Snyder
BY
W. C. Middleton
ATTORNEY INVENTOR.
Kenneth E. Snyder
BY
W. C. Middleton
ATTORNEY

United States Patent Office 3,090,251
Patented May 21, 1963

3,090,251
TRANSMISSION
Kenneth E. Snyder, Northville, Mich., assignor to General Motors Corporation, Detroit, Mich., a corporation of Delaware
Filed Aug. 19, 1957, Ser. No. 678,814
17 Claims. (Cl. 74—677)

This invention relates, in general, to transmissions and, in particular, to controls for the transmissions.

The viscosity of the fluid commonly used in operating various mechanisms for automatic transmissions varies sufficiently with temperature changes to have noticeable influence on the points at which speed ratio changes or shifts occur in the transmission. For example, when hydraulically operated mechanisms are employed to produce these shifts, a normal up shift at one of the lower speed ratios may take place at 15 miles per hour, assuming the fluid is maintained at an acceptable operating temperature. But, if the fluid temperature is below normal, as on a cold morning prior to an adequate period of warmup, the fluid will be sluggish and resist flow. As a result, the hydraulically operated mechanism will be tardy in operation and the same shift then may happen substantially later, e.g., 20 miles per hour. At lower speeds, this becomes more discernable than at higher speeds where a 5 mile per hour delay in an upshift would not be as evident. Furthermore, at lower speeds the variations are more objectionable since the engine speeds up excessively and becomes noisy, especially when cold.

With the foregoing in mind, the present invention contemplates a transmission fluid control system that is sensitive to changes in the viscosity of the fluid and that automatically compensates therefor.

According to the invention, a hydraulically operated mechanism is controlled in a novel manner to establish drive through a transmission uninfluenced by changes in viscosity of the operating fluid due to temperature variations.

Specifically, the invention provides a thermostatic device in the supply line for a hydraulically operated mechanism which device insures that the mechanism becomes operative at substantially the same instant despite changes in flow rates of the fluid to the mechanism due to temperature variations. The device compensates automatically for these changes so that the flow rate is decreased as the temperature increases. Consequently, with cold fluid the device permits considerable fluid to pass to the mechanism whereas the flow of hot fluid is restricted.

According to one form of the invention, a hydraulically operated mechanism, such as a fluid coupling, is combined with planetary gearing to lock up the gearing and afford a direct drive. Fluid for operating the coupling is furnished by a pump through a thermostatic device which compensates for changes in temperature of the fluid so that the fluid coupling will become operative at substantially the same time. By the device, a valve is combined with a bimetallic element to control flow to the fluid coupling. When the fluid is cold, flow is relatively unrestricted, but when the fluid is hot, flow is limited to some predetermined rate. Therefore, a speed ratio change during which the planetary gearing is locked up for direct drive requires the same interval for completion regardless of fluid viscosity changes. By this arrangement, the ratio change of a fluid operated vehicle transmission can be made to take place always at the same chosen vehicle speed uninfluenced by viscosity variations of the operating fluid.

The foregoing and other objects and advantages of the invention will be apparent from the following description and from the accompanying drawings, in which:

FIGURE 1 illustrates schematically a transmission and a control system therefor embodying the principles of the invention;

FIGURE 2 is an enlarged sectional view of a thermostatic device constructed according to the invention and shown in the restricted flow position;

Figure 3:
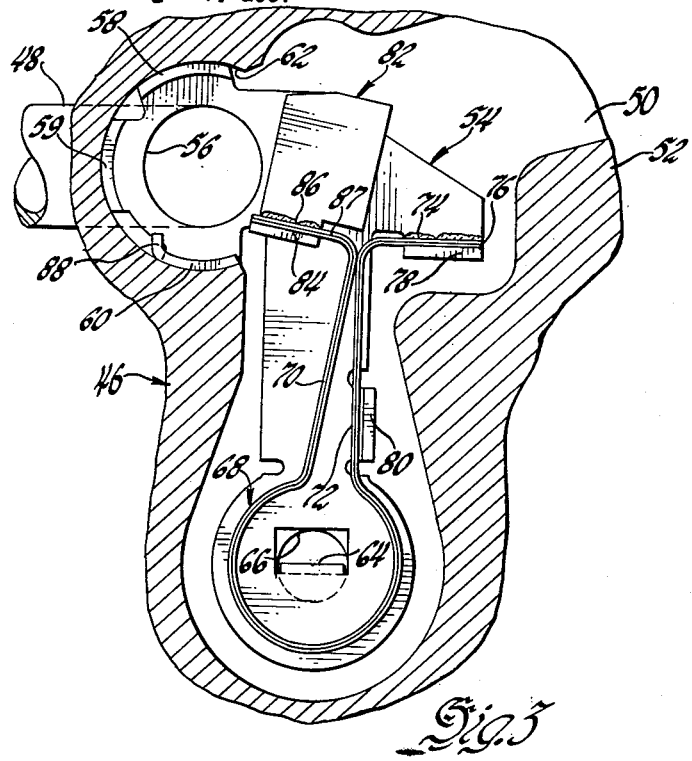
FIGURE 3 is a view similar to FIGURE 2, but with the thermostatic device depicted in the unrestricted flow position.

Referring to the drawings, the invention is best demonstrated by a vehicle transmission utilizing planetary gearing, designated generally at 10. Gearing 10 comprises an input ring gear 12 connected to an input or driving shaft 14, in turn, connected to a suitable power source, e.g., a vehicle engine (not shown), a reaction sun gear 16, and a series of planet pinions 18 journaled on an output carrier 20 and intermeshing with the gears 12 and 16. The output carrier 20 is connected to an output or driven shaft 22 which may be drivingly associated with the vehicle wheels (not shown).

For restraining the reaction sun gear 16 from reverse rotation to afford a reduced drive through the gearing 10, a one-way brake 24 is afforded of a known character employing a series of one-way elements, such as sprags or rollers, which permit the sun gear to rotate forwardly only. With the one-way brake 24 holding the sun gear 16 from rotating backwards, drive will proceed from the input shaft 14 to the ring gear 12 and then at a reduced rate from the carrier 20 to the output shaft 22.

In order to lock up the gear set 10 and establish a direct drive therethrough, it is necessary to clutch together two of the elements of the gearing. To best illustrate the invention, this may be accomplished by a suitable hydraulically operated mechanism such as a disk type friction clutch or as in the preferred form a hydrodynamic device, e.g., a fluid coupling 26. The fluid coupling 26 has a pump member 28 connected to the input ring gear 12 and a turbine member 30 connected to the reaction sun gear 16. When the fluid coupling 26 is filled with fluid, in a manner to be described, drive will be transferred through the medium of the fluid between the pump member 28 and the turbine member 30 so as to drive the reaction sun gear 16 forwardly, allowed by the arrangement of the one-way brake 24, at substantially the same speed as the ring gear 12, the only difference in speed being due to the inherent slippage within the fluid coupling. When the fluid coupling 26 attains maximum operating efficiency, the gearing 10 will be locked up and for all practical purposes afford a substantially direct drive between the input and output shafts 14 and 22.

The control system for supplying the fluid coupling 26 with fluid includes a pump 32 which draws fluid through a suction line 34 from a sump 36. This fluid is then transferred by a supply line 38 to a valve mechanism, designated generally at 40. Interposed in the supply line 38 is a pressure regulating valve 42 which operates in a known way to establish an operating pressure for the system. The valve mechanism 40 may be selectively and/or automatically operated to supply pressure fluid from the pump 32 through a line 44, a thermostatic device, shown at 46, and a coupling supply line 48 to the coupling 26 for a direct drive or to drain the coupling whenever a reduced speed drive is desired.

Figure 4:
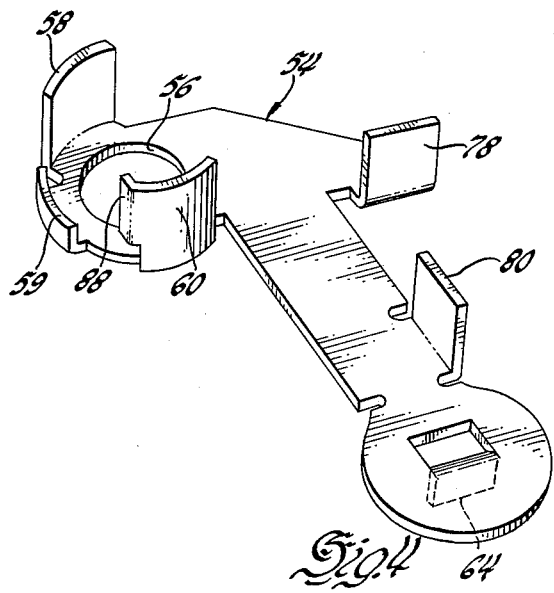
FIGURE 4 is a perspective view of a mounting plate for the thermostatic device.

As best shown by FIGURES 2 and 3, a thermostatic device 46 is installed within an irregularly shaped recess 50 in a casing or housing 52. A mounting or support plate 54 (see FIGURE 4) having an opening 56 in the upper end is installed in the recess 50 and retained therein by the engagement of a series of fingers 58, 59 and 60 surrounding the opening 56 with an adjacent counterbored surface 62. These fingers 58, 59 and 60 are flexible and have at their outer ends a slightly larger diameter than the mating counter-bored surface 62 and hence, clampingly engage the sides of this surface. The mounting plate 54 is further positioned by the engagement of a lanced out portion 64 with a hole 66 at the lower end of the irregularly shaped recess 50. Positioned on the plate 54 is a bimetallic element, denoted generally at 68, having a hairpin-shaped configuration and including a pair of spaced arms 70 and 72. The bimetallic element 68 is affixed to the mounting plate 54 by the attachment at 74 of an end 76, extending laterally from the arm 72, to a tab 78, extending outwardly from the plate 54. Sidewise movement of the fixed arm 72 is limited by another tab 80 similarly extending outwardly from the plate 54. The opposite arm 70 of the bimetallic element 68 is secured to an L-shaped valve 82 which has an outwardly extending leg 84 secured at 86 to an end 87, extending laterally from the arm 70. The finger 60 on the plate 54 has an edge formed to afford to stop 88 for limiting movement of the valve 82 to the left, as viewed in FIGURE 2, and hence, establishes the minimum size of the opening 56.

The bimetallic element 68 is of known construction and is arranged at cold temperatures to move to the FIGURE 3 position in which the valve 82 completely uncovers the opening 56. When the fluid in the recess 50 is at the normal operating temperature, the bimetallic element 68 assumes the FIGURE 2 position with the valve 28 covering a major portion of the opening 56 to produce an orifice which restricts flow therethrough.

To summarize the operation, assume that the fluid is cold and that the thermostatic device 46 is in the FIGURE 3 position. With the fluid coupling 26 void of fluid, drive will be transferred through the gearing 10 between the input and output shafts 14 and 22 at a reduced speed due to the reaction afforded by the one-way brake 24. At a predetermined time, the valve mechanism 40 will become operative to start an upshift and commence the supply of pressure fluid from the pump 32 through the thermostatic device 46 to the coupling 26. Since the opening 56 is completely opened by the valve 82, flow of the cold and sluggish fluid will proceed unimpeded through supply line 48 to the coupling 26 whereupon the coupling will commence the upshift through the gearing by clutching together gears 12 and 16 and establish the substantially direct drive previously discussed. After the vehicle transmission has been operating for some time, the fluid will attain the desired normal operating temperature and, as a result, the valve 82 will have been moved to the FIGURE 2 position restricting flow through the opening 56. Now, when the foregoing upshift takes place, i.e., when the fluid coupling 26 is filled, the flow of the hot fluid will be impeded in such a manner that the fluid coupling will be filled in substantially the same interval as with cold fluid. Therefore, the basic upshift through the gearing 10 will occur at the same predetermined speed, the latter being determined by the operation of the valve mechanism 40. The range of operation of the thermostatic device 46 in compensating for viscosity variations in a particular fluid will be determined by the two hot and cold extremes of a locality in which the device is to be used.

Although the thermostatic device 46 has been demonstrated in conjunction with a fluid coupling, as aforementioned, a different type hydraulically operated mechanism may be utilized and the thermostatic device 46 will still be applicable for controlling the flow rate of fluid thereto. Also, the hydraulically operated mechanism need not be combined with gearing but can be of the character that establishes a drive between an input and an output at a chosen time.

From the foregoing it can be seen that the invention affords a simplified thermostatic device of compact unit structure for controlling fluid flow automatically with changes in temperature so that the associated hydraulically operated mechanism is uninfluenced by changes in viscosity of the operating fluid. As a consequence, speed ratio changes can be caused to happen at a certain speed despite a wide variation in the temperature of the fluid.

I claim:

1. In a transmission having an input and an output, a hydrodynamic drive device for establishing drive between the input and output of the transmission, a source of pressure fluid, a fluid passageway between the source and the device, and means exposed to the fluid within the passageway, the means being sensitive to changes in the temperature of the pressure fluid from the source for controlling the supply of pressure fluid from the source to the hydrodynamic drive device so as to cause the operation of the hydrodynamic device to be relatively unaffected by variations in the temperature of the pressure fluid furnished by the pressure fluid source.

2. In a transmission having an input and an output, a fluid coupling for establishing drive between the input and output of the transmission, a source of pressure fluid, a fluid passageway between the source and the fluid coupling, a valve movable positioned within the passageway, and thermostatic means exposed to the fluid within the passageway, the thermostatic means maneuvering the valve relative to the passageway to vary the flow of pressure fluid between the source and the fluid coupling within a predetermined range in accordance with changes in the temperature of the pressure fluid from the source.

3. In a transmission having an input and an output, a hydraulically operated mechanism for establishing drive between the input and the output for the transmission, a source of pressure fluid, a fluid passageway between the source and the hydraulically operated mechanism, a mounting member disposed within the fluid passageway and having an opening therein through which fluid flows to the hydraulically operated mechanism, a temperature sensitive element located on the mounting member, and a valve maneuverable by the temperature sensitive element relative to the opening, the temperature sensitive element causing the valve to be maneuvered relative to the opening so as to vary the size of the opening within predetermined limits in the mounting member with changes in the temperature of the pressure fluid passing therethrough to control the supply of pressure fluid from the source to the hydraulically operated mechanism.

4. In a transmission having an input and an output, a hydraulically operated mechanism for establishing drive between the input and the output for the transmission, a source of pressure fluid, a fluid passageway between the source and the hydraulically operated mechanism, a mounting member disposed within the passageway and having an opening therein through which fluid flows to the hydraulically operated mechanism, a valve, and a temperature sensitive element interconnecting the valve and the mounting member, the temperature sensitive element being exposed to the fluid within the passageway, the valve being maneuverable relative to the opening in the mounting member by the temperature sensitive element to vary the size of the opening within predetermined limits in accordance with changes in temperature of the pressure fluid passing therethrough so that the operation of the hydraulically operated mechanism is relatively unaffected by variations in the viscosity of the pressure fluid furnished by the pressure fluid source.

5. In a transmission having an input and an output, a fluid coupling for establishing drive between the input and the output for the transmission, a source of pressure fluid, a fluid passageway between the source and the fluid coupling, a mounting plate disposed within the passageway and having an opening therein through which fluid flows to the fluid coupling, a valve, and a bimetallic element exposed to the fluid within the passageway and including spaced arms, one of the arms being connected to the mounting plate and another of the arms being connected to the valve, the valve being maneuverable relative to the opening in the mounting plate by the bimetallic element to vary the size of the opening within predetermined limits in accordance with changes in temperature of the pressure fluid passing therethrough so that the time required to fill the coupling is relatively unaffected by variations in the viscosity of the pressure fluid furnished by the pressure fluid source.

6. In a transmission, gearing, a hydraulically operated mechanism for so conditioning the gearing as to establish drive therethrough at a selected speed ratio, a source of pressure fluid, a fluid passageway between the source and the hydraulically operated mechanism, and means exposed to the fluid within the passageway, the means being sensitive to changes in temperature of the pressure fluid from the source for controlling the quantity of pressure fluid supplied by the source to the hydraulically operated mechanism so as to cause the operation of the mechanism to be relatively unaffected by variations in the temperature of the pressure fluid furnished by the pressure fluid source.

7. In a transmission, gearing, a hydraulically operated mechanism for so conditioning the gearing as to establish drive therethrough at a selected speed ratio, a source of pressure fluid, a fluid passageway between the source and the hydraulically operated mechanism, a valve movably positioned within the passageway, and thermostatic means exposed to the fluid within the passageway, the thermostatic means cooperating with the valve to control the quantity of pressure fluid supplied by the source to the hydraulically operated mechanism in accordance with changes in the temperature of the pressure fluid so as to cause the operation of the mechanism to be relatively unaffected by variations in the temperature of the pressure fluid furnished by the pressure fluid source.

8. In a transmission, a hydraulically operated mechanism for so conditioning the gearing as to establish drive therethrough at a selected speed ratio, a source of pressure fluid, a fluid passageway between the source and the hydraulically operated mechanism, a valve movably positioned within the passageway, and a temperature sensitive element exposed to the fluid within the passageway and coacting with the valve to control the quantity of pressure fluid supplied by the source to the hydraulically operated mechanism in accordance with changes in temperature of the pressure fluid so as to cause the operation of the mechanism to be relatively unaffected by variations in the temperature of the pressure fluid furnished by the pressure fluid source.

9. In a transmission, planetary gearing including input, output and reaction elements, means for restraining the reaction element from rotation to establish one speed ratio, a hydraulically operated mechanism for connecting two of the elements together to establish another speed ratio through the gearing, a source of pressure fluid, a fluid passageway between the source and the hydraulically operated mechanism, a mounting member disposed within the passageway and having an opening therein through which the fluid flows to the hydraulically operated mechanism, a temperature sensitive element located on the mounting member and exposed to the fluid within the passageway, and a valve positionable by the temperature sensitive element relative to the opening, the valve and the temperature sensitive element coacting to vary the size of the opening within predetermined limits in the mounting member in acordance with changes in the temperature of the pressure fluid passing therethrough to control the supply of pressure fluid from the source to the hydraulically operated mechanism.

10. In a transmission, planetary gearing including input, output and reaction elements, means for restraining the reaction element from rotation to establish one speed ratio, a fluid coupling for connecting two of the elements together to establish another speed ratio to the gearing, a source of pressure fluid, a passageway between the source and the fluid coupling, a mounting plate disposed within the passageway having an opening therein through which fluid flows to the fluid coupling, a valve, a bimetallic element including spaced arms, one of the arms being connected to the mounting plate and another of the arms being connected to the valve, the valve being positionable relative to the opening in the mounting plate by the bimetallic element to vary the size of the opening within predetermined limits in accordance with changes in temperature of the pressure fluid passing therethrough so that the time required to fill the coupling is relatively uneffected by variations in the viscosity of the pressure fluid furnished by the source.

11. In a transmission having an input and an output, a fluid pressure operated device for establishing drive between the input and output of the transmission, a source of pressure fluid, a fluid passageway between the source and the device, and means exposed to the fluid within the passageway, the means being operative to control the supply of pressure fluid from the source for operating the mechanism in accordance with changes in the temperature of the pressure fluid from the source so as to cause the operation of the fluid pressure operated device to be relatively unaffected by variations in the temperature of the pressure fluid furnished by the pressure fluid source.

12. In a transmission having an input and an output, a hydraulically operated mechanism for establishing drive between the input and output, a source of pressure fluid, a fluid passageway between the source and the hydraulically operated mechanism, and a bimetallic valve element situated in the passageway so as to be exposed to the fluid within the passageway, the bimetallic valve element being sensitive to temperature changes in the fluid and so arranged in the passageway as to control the flow of fluid through the passageway and to the hydraulically operated mechanism in accordance with temperature changes in the fluid.

13. In a transmission having an input and an output, a fluid coupling for establishing drive between the input and the output, a source of pressure fluid, a fluid passageway between the source and the fluid coupling, a valve element arranged for movement in the passageway so as to control fluid flow therethrough to the fluid coupling, and a U-shaped bimetallic element positioned within the passageway so as to be exposed to the fluid therein, the bimetallic element having one leg thereof fixed and the other leg thereof joined to the valve element so that the bimetallic element will maneuver the valve element so as to vary the flow of fluid through the passageway in accordance with changes in temperature of the fluid.

14. In a transmission ratio establishing means conditioning the transmission for different drive ratios, the ratio establishing means including a fluid coupling, a source of pressure fluid, a fluid passageway between the source and the fluid coupling, a valve element arranged for movement in the passageway so as to control fluid flow therethrough, and a U-shaped bimetallic element positioned within the passageway so as to be exposed to the fluid therein, the bimetallic element having the one leg thereof fixed and the other leg thereof joined to the valve element so that the bimetallic element will maneuver the valve element so as to vary flow through the passageway with temperature changes in the fluid and thereby cause the time required to fill the coupling during a ratio change to be relatively unaffected by the variations in the viscosity of the fluid supplied by the source.

15. In a transmission having an input and an output, a hydrodynamic drive device for establishing drive between the input and the output of the transmission, a source of pressure fluid, a fluid passageway between the source and the device, and means exposed to the fluid within the passageway, the means being sensitive to changes in the temperature of the pressure fluid from the source and so arranged as to be movable relative to the passageway thereby controlling the supply of pressure fluid from the source to the hydrodynamic drive device and rendering the operation of the hydrodynamic device relatively unaffected by variations in the temperature of the pressure fluid furnished from the pressure fluid source.

16. In a transmission, gearing, a pressure fluid operated mechanism for so conditioning the gearing as to establish drive therethrough at a selected speed ratio, a source of pressure fluid, a fluid passageway between the source and the pressure fluid operated mechanism, and means exposed to the fluid within the passageway, the means being so arranged as to cause the rate at which pressure fluid is supplied by the source to the pressure fluid operated mechanism to be varied in accordance with the temperature of the pressure fluid.

17. In a transmission, gearing, a pressure fluid operated mechanism for so conditioning the gearing as to establish drive therethrough at selected speed ratios, a source of pressure fluid, a fluid passageway between the source and the pressure fluid operated mechanism, a valve movably positioned within the passageway, and thermostatic means exposed to the fluid within the passageway, the thermostatic means being so arranged as to cause the valve to decrease the flow of pressure fluid from the source to the fluid pressure operated mechanism as the temperature of the pressure fluid increases.

References Cited in the file of this patent
UNITED STATES PATENTS

| | | |
|---|---|---|
| 2,144,596 | Daiber | Jan. 17, 1939 |
| 2,299,049 | Ziebold | Oct. 13, 1942 |
| 2,376,545 | Livermore | May 22, 1945 |
| 2,564,112 | Kittler | Aug. 14, 1951 |
| 2,606,456 | Dodge | Aug. 12, 1952 |
| 2,631,432 | Newcomb | Mar. 17, 1953 |
| 2,726,557 | Ackerman | Dec. 13, 1955 |
| 2,794,349 | Smirl | June 4, 1957 |
| 2,837,285 | Urban | June 3, 1958 |
| 2,903,912 | Edsall et al. | Sept. 15, 1959 |